(12) United States Patent
Katz et al.

(10) Patent No.: US 6,691,919 B1
(45) Date of Patent: Feb. 17, 2004

(54) INTEGRATED BAR CODE SCANNER AND COMMUNICATIONS MODULE

(75) Inventors: Joseph Katz, Stony Brook, NY (US); Chinh Tan, Centereach, NY (US); David Goren, Smithtown, NY (US); Miklos Stern, Flushing, NY (US); Ed Barkan, Miller Place, NY (US); Howard Shepard, Great River, NY (US); Frederick Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/471,306

(22) Filed: Dec. 23, 1999

Related U.S. Application Data

(63) Continuation-in-part of application No. 09/047,015, filed on Mar. 24, 1998, now abandoned.

(51) Int. Cl.[7] ................................................. G06K 7/10
(52) U.S. Cl. ............................ 235/462.01; 235/462.25; 235/462.46
(58) Field of Search ........................ 235/462.01, 462.06, 235/462.13, 462.17, 462.25, 462.26, 462.3, 462.43, 462.46, 472.02, 454, 462.45, 1.48, 462.49, 472.01, 472.03; 369/112.19

(56) References Cited

U.S. PATENT DOCUMENTS

| | | | | |
|---|---|---|---|---|
| 4,465,926 A | * | 8/1984 | Apitz et al. ............. 235/454 X |
| 4,906,830 A | * | 3/1990 | Hasegawa et al. ...... 235/462.13 |
| 5,260,554 A | * | 11/1993 | Grodevant ............. 235/462.31 |
| 5,371,347 A | * | 12/1994 | Plesko ............... 235/462.46 X |
| 5,581,707 A | * | 12/1996 | Kuecken ............ 235/462.46 X |
| 5,602,380 A | * | 2/1997 | Bishay .............. 235/462.46 X |
| 5,656,805 A | * | 8/1997 | Plesko ............... 254/472.02 X |
| 5,684,780 A | * | 11/1997 | Ando ......................... 369/110 |
| 5,786,582 A | * | 7/1998 | Roustaei et al. ........ 235/462.07 |
| 5,925,872 A | * | 7/1999 | Wyatt et al. ........ 235/462.43 X |
| 5,974,066 A | * | 10/1999 | Wu et al. ...................... 372/43 |
| 6,058,304 A | * | 5/2000 | Callaghan et al. .. 235/462.46 X |
| 6,225,938 B1 | * | 5/2001 | Hayes et al. ........ 235/462.46 X |
| 6,300,880 B1 | * | 10/2001 | Sitnik ................ 235/462.46 X |
| 6,547,146 B1 | * | 4/2003 | Meksavan et al. ..... 235/462.46 |

FOREIGN PATENT DOCUMENTS

| | | | |
|---|---|---|---|
| JP | 5-233865 A | * | 9/1993 |
| JP | 11-175670 A | * | 7/1999 |

* cited by examiner

Primary Examiner—Jared J. Fureman

(57) ABSTRACT

An integrated optical communication and barcode scanning module suitable for use with portable electronic devices is provided. In a first mode of operation the module functions as an Infrared Data Association (IrDA) compatible communications interface. In a second mode of operation, IrDA communications is disabled, and the module functions as a barcode scanner. The module may be switched back and forth between the two modes of operation or operated simultaneously.

31 Claims, 5 Drawing Sheets

INTEGRATED BAR CODE SCANNER AND COMMUNICATIONS MODULE

This application is a continuation-in-part of co-owned application Ser. No. 09/047,015, filed Mar. 24, 1998, now abandoned the disclosure of which is incorporated herein by reference.

BACKGROUND OF THE INVENTION

This application relates to portable electronic devices, and more particularly to a barcode scanner and communications module for use with such devices.

In the past, various optical readers and scanning systems have been developed for reading barcode symbols appearing on a label or surface of an article. Generally, a barcode symbol is a coded pattern of indicia comprised of a series of bars of various widths separated by spaces of various widths, the bars and spaces having different light-reflecting characteristics. Barcode scanning systems electro-optically transform the graphic indicia into electrical signals. The system decodes these signals into alpha-numerical characters that provide some information about the article. Such characters are typically represented in digital form, and are used as input to processing systems associated with applications such as point-of-sale and inventory control. Scanning systems of this general type are well known in the art and have been disclosed, for example, in U.S. Pat. Nos. 4,251,798, 4,360,798, 4,369,361, 4,387,297, 4,409,470 and 4,460,120, all assigned to the assignee of the present invention.

Such scanning systems generally include a hand-held laser scanning unit. The scanning unit is configured to enable a user to aim it at a barcode pattern and emit a beam of light. The light beam is optically modified, typically by a lens or mirror, to form a beam spot of a certain size at a target distance. Preferably, the beam spot size at the target distance is approximately the same as the minimum width between regions of different light reflectivity, (i.e., the bars and spaces of the symbol).

Barcode scanning systems typically include a sensor such as a photodetector, that detects light scattered back from the barcode pattern. The photodetector is usually positioned in the scanner such that it has a field of view which extends across and slightly past a symbol within the pattern. A portion of the light that is reflected off the symbol is acquired and converted into an electrical signal. Subsequently, electronic circuitry or software converts the electrical signal into a digital representation of the data contained therein. For example, the analog electrical signal from the photodetector may be converted into a pulse width modulated digital signal, with the widths corresponding to the physical widths of the bars and spaces. Such a signal is then decoded according to the appropriate protocol into a desired information format.

Currently, however, many portable electronic products such as notebook computers, personal digital assistants (PDAs), cellular telephones, and calculators do not have barcode scanners included as one of their peripheral devices. One reason for this is lack of space on such devices for an independent barcode scanning module. If, however, a barcode scanner could be integrated alongside an existing peripheral such as an Infrared Data Association (IrDA) interface, without substantially increasing the peripheral's volume, the functionality of such portable electronic devices could be advantageously increased.

It would therefore be desirable to provide an integrated communication and barcode scanning module for portable electronic devices.

SUMMARY OF THE INVENTION

It is therefore an object of the present invention to provide an integrated communication and barcode scanning module for portable electronic devices.

This and other objects of the present invention are accomplished by providing an integrated optical communication and barcode scanning module for portable electronic devices. The module is generally capable of two mutually exclusive modes of operation, a data acquisition mode and a communications mode. In the communications mode, the module may be configured to function as an IrDA communications interface. In the data acquisition mode, the module is configured to function as a barcode scanner.

The integrated module may include a scanning mirror, a light emitting diode (LED), a receiver photodiode, a power-monitoring photodiode, and a semiconductor laser diode. In the communications mode, the module pulses the LED ON and OFF to transmit light signals. Incoming light signals are received by the scanning mirror and reflected off of a the collection optics in a canopy assembly located above the sensing components and onto the receiver photodiode. The receiver photodiode converts the light signals into electrical signals which are subsequently processed and converted into digital information. A preferred embodiment of the collection optics is a parabolic mirror, but other optical surfaces such as spherical or aspheric mirrors are acceptable.

In the data acquisition mode, optical communication is temporarily disabled and the components required for barcode scanning are turned ON. This includes actuating the scanning mirror, and activating the laser diode and power-monitoring photodiode. Light signals generated by the laser diode are reflected off of a focusing mirror that is recessed from the parabolic mirror and behind and aperture and onto a nearby barcode pattern. A portion of the light signal is reflected back onto the parabolic mirror and is directed to the receiver photodiode. Circuitry within the integrated module converts the light signals into electrical signals which are subsequently processed into digital information.

A portion of the light signal emitted by the laser diode is deflected from a section of the parabolic mirror around the aperture toward the power-monitoring photodiode. This is done in order to sense the intensity of the emitted light signal. The intensity of the light signal is monitored to ensure that it is within acceptable operating parameters. The module is preferably constructed such that it fits into a space roughly equivalent to that of a conventional IrDA port.

In an alternative embodiment, the barcode scanner could also be implemented using an infrared wavelength. To accomplish this, however, an additional visible light source is required for aiming.

In addition, the module can be implemented as a surface mountable component.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
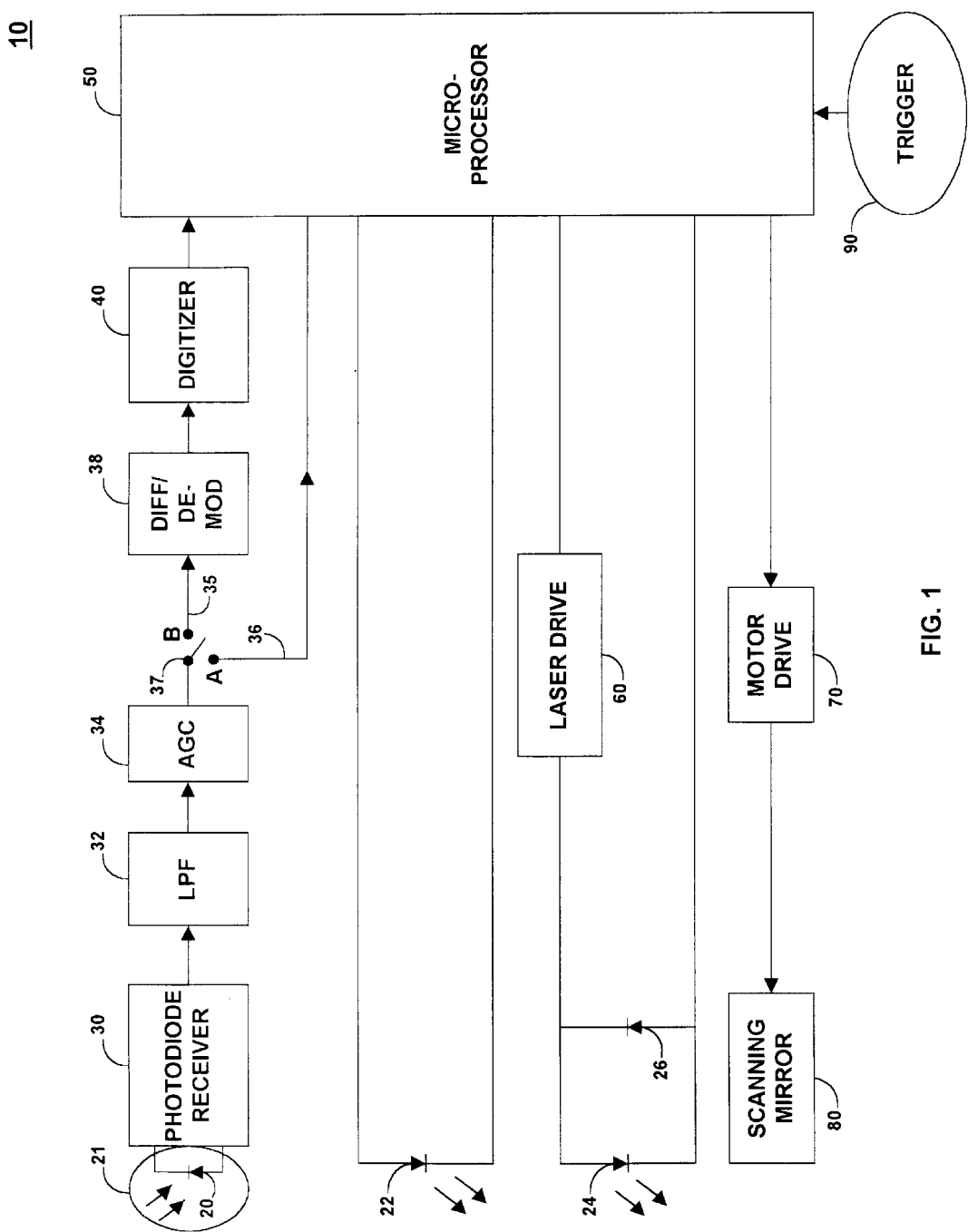
FIG. 1 is a block diagram of an integrated optical communication and barcode scanning module for portable electronic devices in accordance with the principle of the present invention.

FIG. 1 shows a block diagram of a communications and data acquisition module 10 constructed in accordance with the principles of the present invention. Module 10 generally includes receiver photodiode 20, optical filter/shield 21, light emitting diode (LED) 22, semiconductor laser diode 24, monitor photodiode 26, receiver circuit 30, lowpass filter 32, adjustable gain circuit 34, paths 35 and 36, two position switch 37, differentiation/demodulator (D/D) 38, digitizer 40, microprocessor 50, laser drive 60, motor drive 70, scanning mirror 80, and trigger 90.

Broadly speaking, module 10 is capable of two modes of operation, a data acquisition mode and a communications mode. In the communications mode, module 10 may be configured to operate as an IrDA compatible optical communications interface. This enables an electronic device that includes module 10 to communicate with other devices having a similar interface. When module 10 is converted to the data acquisition mode, however, it is configured to operate as a bar code scanner so a user may also acquire barcode information. The two modes of operation are preferably mutually exclusive such that module 10 is either configured as an IrDA interface or as a bar code scanner.

In the communications mode, data, in the form of optical signals, is received from a proximate device (not shown) by photodiode 20 and converted into a small photocurrent. Optical filter/shield 21, which is preferably electrically grounded, may be placed over photodiode 20 in order to reduce the effects of ambient light and electronic noise. Receiver circuit 30, which preferably includes bias circuitry for photodiode 20, converts the photocurrent into a proportional voltage signal. Lowpass filter 32 receives the voltage signal and filters out signal components which are not within a selected frequency range. This improves the signal to noise ratio (SNR) of the acquired signal. Adjustable gain circuit 34 amplifies the filtered voltage signal and supplies it to microprocessor 50 via path 36 where the signal is processed (e.g., decoded, interpreted, etc.) in accordance with the appropriate communication protocol (e.g., IrDA decoding).

The gain provided by circuit 34 is selectable depending on the mode of operation of system 10. For example, while operating in the communications mode, the gain of circuit 34 may be set at a first value suitable for IrDA communication (e.g., about 30). On the other hand, when system 10 is operating in the data acquisition mode, the gain of circuit 34 may be set to a range of different values suitable for amplifying acquired barcode signals (e.g., about 10–150). In the embodiment shown in FIG. 1, the frequency range of lowpass filter 32 is set at a fixed value. This is acceptable because the bandwidths for standard barcode scanning and IrDA communication are currently the same (e.g., up to 4 MHz). If, however, IrDA data rates increase, the frequency range of lowpass filter 32 may be adjusted. In addition, the optical bandwidth of filter/shield 21 is set at a fixed value. This is also permissible for embodiments where the data acquisition interface and communications interface employ signals of substantially the same wavelength (e.g., 850 nm). In other embodiments, however, the optical bandwidth of filter/shield 21 may be widened, configured to have two distinct passbands, or electrically adjusted to be mode-specific if the wavelengths vary somewhat (e.g., communication at 850 nm, acquisition at 650 nm).

As shown in FIG. 1, module 10 may transmit data signals to other devices using LED 22. Microprocessor 50 (which may be embedded in or external to module 10) pulses LED 22 ON and OFF to generate such signals. A nearby device (not shown) receives these signals and may process them in a manner similar to that described above. Microprocessor 50 preferably coordinates operation of module 10 so that it periodically alternates between sending data signals (using LED 22) and receiving data signals (using photodiode 20). This prevents two devices from sending signals at the same time which can result in "collision condition" wherein the signals destructively interfere with one another such that they cannot be effectively received by either device.

Figure 2:
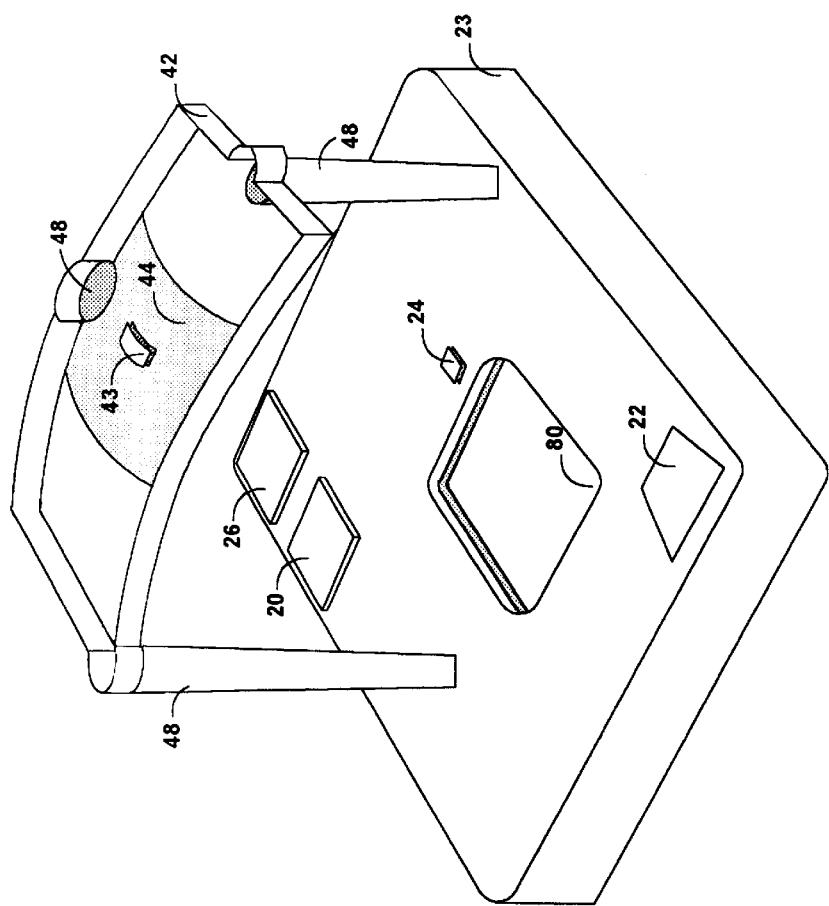
FIG. 2 is an elevated side view of one suitable arrangement of a canopy assembly and selected components in the module.

FIG. 2 shows an elevated side view of one suitable arrangement for selected components in module 10. As shown in FIG. 2, the components used to acquire and transmit light signals are integrated together into a single unit. LED 22, which may be used for IrDA communication, is located in a corner of module 10. Scanning mirror 80 may be located in a central portion of base section 23. Laser diode 24 (which may be an edge-emitting semiconductor laser, a vertical cavity surface emitting laser (VCSEL), or the like) may located slightly above scanning mirror 80 with photodiodes 20 and 26 located in the upper left hand corner. It will be understood, however, that this is merely an example of one particular specific arrangement of the components in module 10, and that many other suitable arrangements are also possible.

Figure 3:
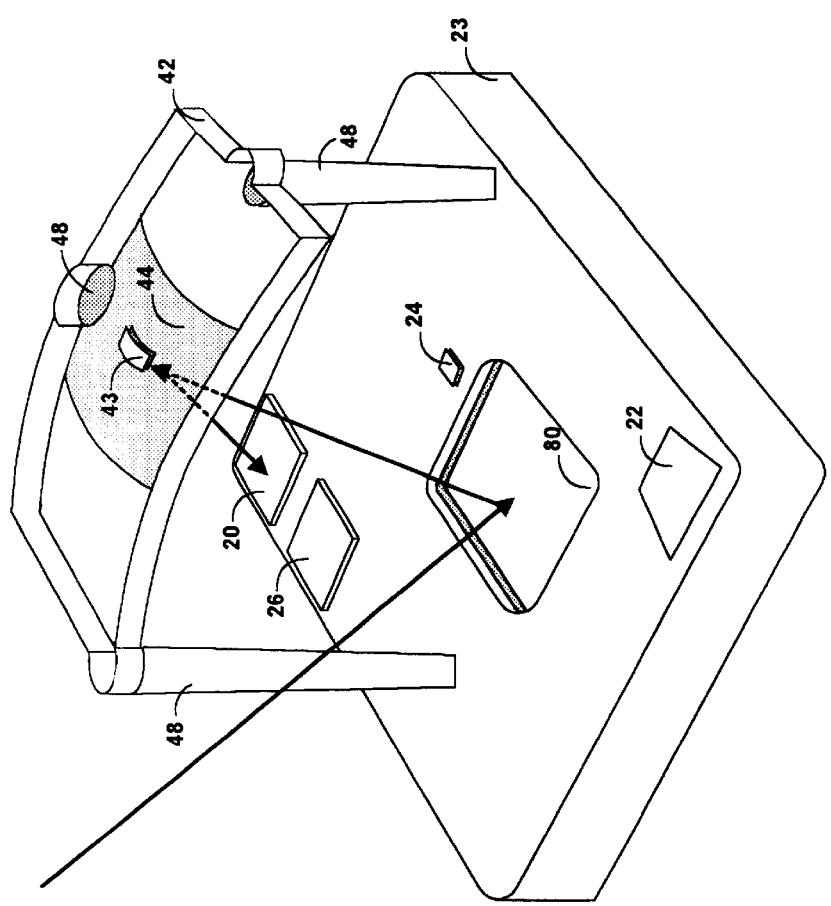
FIG. 3 illustrates the path of an incoming light signal acquired by the module.

While in communications mode, data may be transmitted to a nearby device simply by pulsing LED 22 ON and OFF. When receiving incoming communication signals, however, module 10 employs scanning mirror 80. Scanning mirror 80 is configured to deflect incoming light signals onto parabolic mirror 44, (located on the inside surface of canopy 42), which is angled such that it directs the majority of light signals to receiver photodiode 20 (shown in FIG. 3). The light signals are then converted into electrical signals as described above.

When microprocessor 50 receives trigger signal 90, module 10 may be converted from communications mode to data acquisition mode. When this transition occurs, optical communication is temporarily disabled. This means, among other things, that LED 22 is turned OFF, path 36 is opened (e.g., by moving the arm of switch 37 from position A to position B, or by enabling or disabling CMOS transmission gate(s), etc.), and the gain of circuit 34 is set to a value suitable for barcode reading. Next, microprocessor 50 activates the circuitry used for barcode scanning. This includes turning ON motor drive 70 in order to actuate scanning mirror 80. It also includes turning ON laser drive 60 to activate laser diode 24 and monitoring photodiode 26. D/D 38 and digitizer 40 may also be activated.

Figure 4:
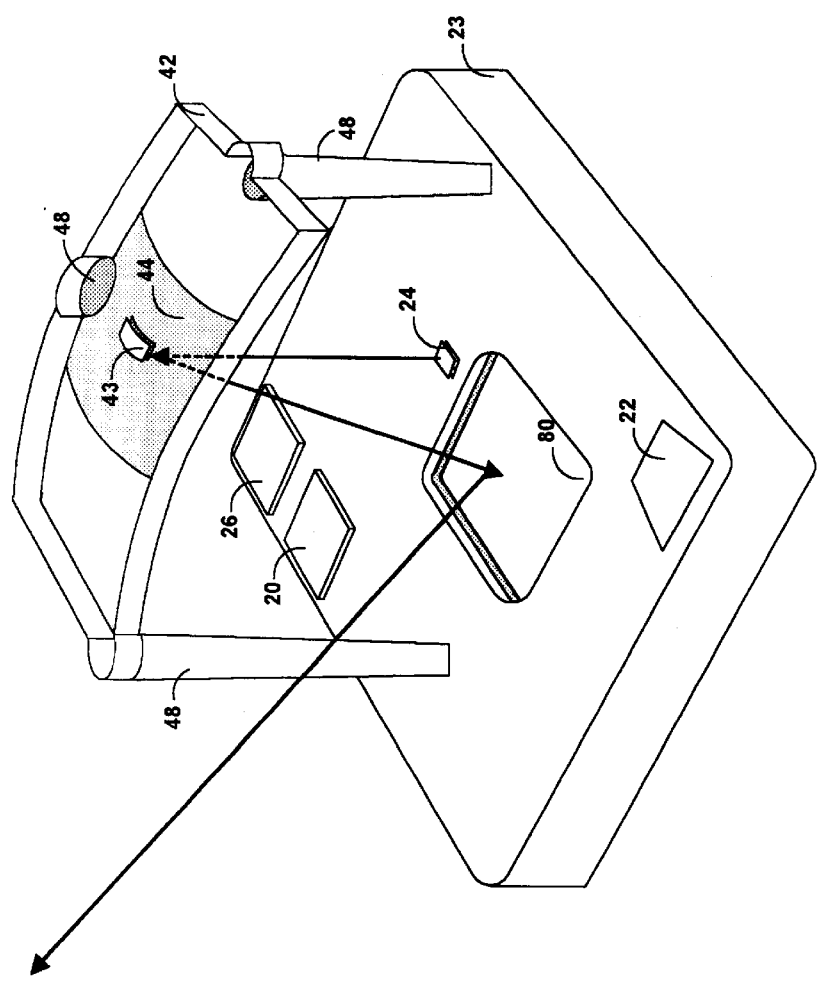
FIG. 4 illustrates the path of an outgoing light signal provided for barcode scanning.

Next, light signals generated by laser diode 24 are reflected off of a recessed focusing mirror 43 (shown in FIG. 4) to scanning mirror 80, and then onto a nearby barcode pattern (not shown). A portion of the light signal is scattered back from the barcode pattern and collected by scanning mirror 80. Scanning mirror 80 then deflects the received light signal onto parabolic mirror 44 which directs the light to receiver photodiode 20 (shown generally in FIG. 3).

Figure 5:
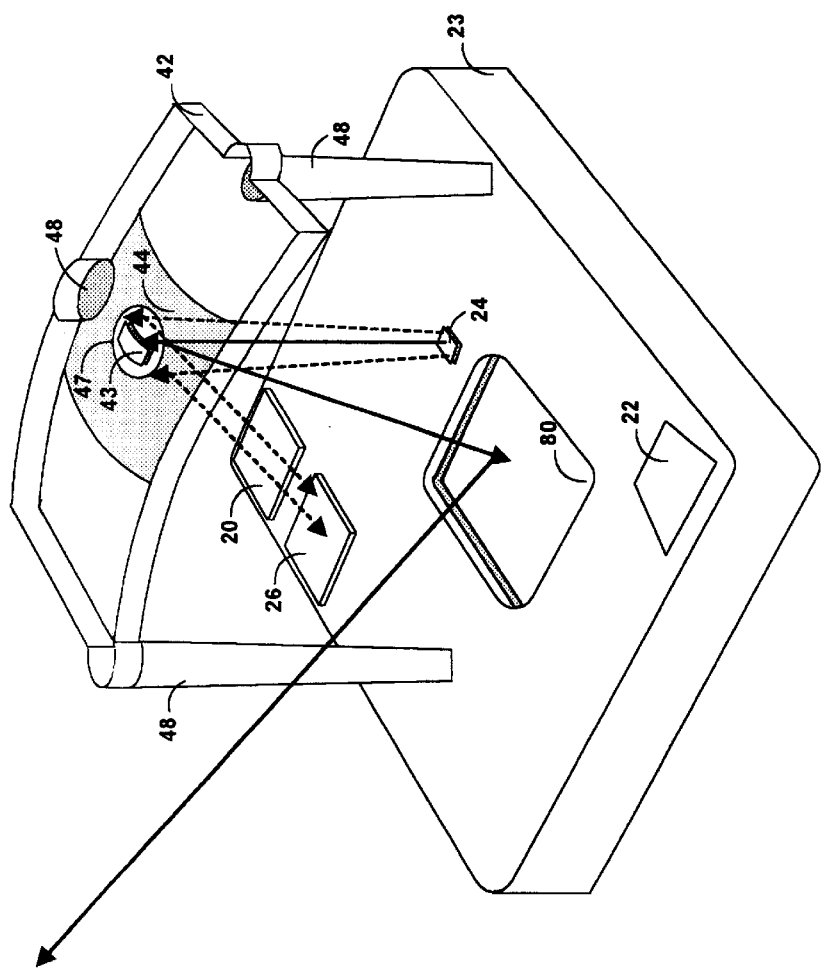
FIG. 5 illustrates the path of an outgoing light signal deflected onto a power-monitoring photodiode.

As shown in FIG. 5, a portion of the light signal emitted by laser diode 24 is deflected from a section of parabolic mirror 44 around aperture region 47 toward power-monitoring photodiode 26. This is done in order to sense the intensity of the emitted light signal. Microprocessor 50 monitors photodiode 26 to ensure that the intensity of the light signal is within acceptable operating parameters. If it is determined that the intensity of the light signal is below a minimum value, laser drive 60 may supply additional current to laser diode 24 to increase signal strength. Alternatively, if the light signal intensity is above a maximum value, laser drive 60 may reduce the current supplied to laser diode 24 to decrease signal strength.

It should be noted that photodiodes 20 and 26 should be positioned with respect to laser diode 24 and scanning mirror 80 such that light deflected by aperture region 47 cannot be acquired by scanning mirror 80 and directed to receiver photodiode 20, otherwise internal noise may be generated. This type of noise is particularly problematic because it is usually several orders of magnitude stronger than the signal returned from the barcode pattern, and resides in the frequency band.

As shown in FIGS. 2–5, canopy 42 may have precision molded legs 48 that accurately set the distance between laser diode 24 and focusing mirror 43, so that passive focusing may be used. If desired, however, active focusing could be implemented, (e.g., by using movable legs that adjust the distance between laser diode 24 and focusing mirror 43) and may be required in more demanding applications where longer working range is needed. Such an implementation would require the use of laser to mirror focusing feedback circuitry and adjustable support legs (not shown). A form of active focusing may also include actively monitoring a beam spot during assembly and setting the distance between laser diode 24 and focusing mirror 43 to a particular value (e.g., a user-defined value or a value for a special application).

A scattered signal from a barcode pattern incident upon signal photodiode 20 is converted into a small photocurrent which is changed into a voltage signal by receiver 30. Lowpass filter 32 receives the voltage signal and filters out signal components which are not within a selected frequency range. Adjustable gain circuit 34 then amplifies the filtered voltage signal with the appropriate gain value and applies it to D/D 38 via path 35. D/D 38 typically includes analog differentiation circuitry and/or edge detector circuitry for determining the time intervals between peaks in the voltage signal. These time intervals typically correspond to the length and/or width of the scanned barcode symbols. The differentiated signal is supplied to digitizer 40 (e.g., an analog to digital converter) which converts the analog signals to digital format (e.g., simple binary digitizing, pulse width modulation, etc.). Microprocessor 50 interprets and/or decodes the digitized signal in accordance with the appropriate barcode protocol.

Several advantages are realized by employing the module arrangement shown in FIGS. 1–5. For example, combining the two interfaces into a single module 10 reduces the overall size, as both interfaces have some common circuitry (e.g., photodiode 20, receiver 30, lowpass filter 32, and adjustable gain circuit 34). This permits module 10 to be installed into a space roughly equivalent to that currently used by a conventional IrDA port, thus providing the user with a scanning function in addition to a communications function. Another advantage of module 10 is its reduced cost as compared to that of producing two separate interfaces.

If desired, the components mounted in base portion 23, i.e., LED 22, scanning mirror 80, laser diode 24, and photodiodes 20 and 26 of module 10 may fabricated on a common substrate. In addition, the processing electronics shown in FIG. 1 may be fabricated on a single application-specific integrated circuit (ASIC) mounted on the rear of that substrate. This may further reduce the size and power consumption of module 10. Moreover, if desired, LED 22 may be removed from module 10, and laser diode 24 may be used to transmit IrDA data signals while in the communications mode, further reducing the size and complexity of module 10. Alternatively, laser diode 24 may be in the form of a chip consisting of multiple lasers where as one is used for bar code scanning, others are used for communication. Module 10 may also be fabricated in packages suitable for surface mounting.

Thus, it is seen that a communications and data acquisition module suitable for use with portable electronic devices is provided. The module preferably fits an into a space roughly equivalent to that of a conventional peripheral—e.g., an IrDA port, and adds increased functionality, i.e., barcode scanning in addition to an optical communication capability. However, in products where size is not critical, a barcode scanner may be simply added to a device with an IrDA port or vice-versa. In such an embodiment, the electronics may be entirely separate from one another or partially or fully shared.

Persons skilled in the art will appreciate that the present invention can be practiced by other than the described embodiments, which are presented for purposes of illustration rather than of limitation, and the present invention is limited only by the claims which follow.

The invention claimed is:

1. A portable device comprising:
    an optical module that is configurable as at least one of a barcode scanner and an optical communications transceiver, the barcode scanner employs a portion of the optical communications transceiver to process barcode data; and
    a signal processing circuit, comprising:
        a processor that processes signals acquired by at least one of the barcode scanner and communications transceiver; and
        a switch that forwards a received analog signal to the processor when in a first position, and forwards the analog signal to a differentiation/demodulation circuit of the bar code scanner when in a second position.

2. The device of claim 1 wherein said optical communications transceiver is an Infrared Data Association (IrDA) communications interface.

3. The device of claim 1 wherein said barcode scanner includes a power monitoring photodiode.

4. The device of claim 1 wherein the module is a surface mountable component.

5. An integrated communication and data acquisition module for portable electronic devices comprising:
    data acquisition sub-assembly for barcode scanning;
    communications sub-assembly for transmitting and receiving optical data signals, the module being configurable for at least one of barcode scanning and transmitting and receiving optical data signals, the data acquisition sub-assembly employs a portion of the communications subassembly to process barcode data; and
    a signal processing circuit, comprising:
        a processor that processes signals acquired by at least one of the data acquisition sub-assembly and communications sub-assembly; and a switch that forwards a received analog signal to the processor when in a first position, and forwards the analog signal to a differentiation/demodulation circuit of the data acquisition sub-assembly when in a second position.

6. The device of claim 5 wherein said module is installed in one of a personal digital assistant (PDA), portable electronic device, and cell phone.

7. The device of claim 5 wherein said module is capable of dual-mode operation such that during a first mode of operation said communications sub-assembly is active and said data acquisition sub-assembly is disabled, and during a second mode of operation said communications interface is disabled and said data acquisition interface is active.

8. The device of claim 5 wherein said communications sub-assembly is configured to operate as an Infrared Data Association (IrDA) communications interface.

9. The device of claim 5 wherein said module further comprises an actuatable mirror for barcode scanning.

10. The device of claim 5 wherein said data acquisition sub-assembly further comprises a semiconductor laser for generating light signals used for barcode scanning.

11. The device of claim 9 wherein said semiconductor laser is one of a Vertical Cavity Surface Emitting Laser (VCSEL) and an edge-emitting laser.

12. The device of claim 5 wherein said communications sub-assembly further comprises one of a light emitting diode (LED) and a semiconductor laser to generate said optical data signals.

13. The device of claim 5 wherein said module further comprises at least one receiving photodiode to sense said optical data signals.

14. The device of claim 5 wherein said module further comprises at least one receiving photodiode for sensing barcode signals and said optical data signals.

15. The device of claim 5 wherein said module further comprises a canopy assembly having at least one optical surface.

16. The device of claim 15 wherein said module further comprises a focusing mirror recessed from a parabolic mirror.

17. The device of claim 16 wherein said canopy assembly is situated above said data acquisition and communications sub-assemblies such that at least a portion of a light signal generated by said data acquisition sub-assembly is reflected off of said focusing mirror and onto a nearby barcode pattern.

18. The device of claim 17 wherein said canopy assembly further comprises an aperture region located around a periphery of said focusing mirror.

19. The device of claim 18 wherein said canopy assembly is situated above said data acquisition and communications sub-assemblies such that at least a portion of a light signal generated by said data acquisition sub-assembly is reflected off of said aperture region and onto a power-monitoring photodiode.

20. The device of claim 19 wherein an electronic circuit monitors said power monitoring photodiode in order to determine a strength of said light signal.

21. The device of claim 20 wherein said electronic circuit adjusts an intensity of said light signal such that the intensity remains within a preset range.

22. An integrated communication and data acquisition module for portable electronic devices comprising:
data acquisition subassembly for barcode scanning;
communications sub-assembly for transmitting and receiving optical data signals, the module being configurable for at least one of barcode scanning and transmitting and receiving optical data signals, the data acquisition sub-assembly employs a portion of the communications subassembly to process barcode data; and
a signal processing circuit, comprising:
a processor that processes signals acquired by at least one of the data acquisition sub-assembly and communications sub-assembly; and
a switch that forwards a received analog signal to the processor when in a first position, and forwards the analog signal to a differentiation/demodulation circuit of the data acquisition sub-assembly when in a second position.

23. The device of claim 22 wherein said module further comprises a receiving photodiode for sensing barcode signals and said optical data signals, said receiving photodiode converting said barcode signals and optical data signals into analog signals.

24. The device of claim 23 wherein said receiving photodiode further comprises an optical band-pass filter and shield.

25. The device of claim 23 wherein said signal processing circuit comprises a filter coupled to said receiving photodiode for filtering said analog signals.

26. The device of claim 25 wherein said signal processing circuit further comprises an adjustable gain circuit coupled to said receiving photodiode for amplifying said filtered analog signals.

27. An integrated communication and data acquisition module for portable electronic devices comprising:
data acquisition sub-assembly for barcode scanning;
communications sub-assembly for transmitting and receiving optical data signals; and
at least one signal processing circuitry for processing signals acquired by at least one of said data acquisition and communications sub-assemblies;
wherein said module further comprises:
a receiving photodiode for sensing barcode signals and said optical data signals, said receiving photodiode converting said signals into analog signals;
wherein said signal processing circuitry further comprises:
a filter coupled to said receiving photodiode for filtering said analog signals;
an adjustable gain circuit coupled to said receiving photodiode for amplifying said filtered analog signals;
a processor circuit;
a differentiation/demodulation circuit; and
a switch, said switch coupling said amplified analog signals to said processor circuit when said switch is in a first position, and said switch coupling said amplified analog signals to said differentiation/demodulation circuit when said switch is in a second position.

28. The device of claim 27 wherein said processor circuit decodes said amplified analog signals in accordance with an Infrared Data Association (IrDA) communication protocol.

29. The device of claim 28, wherein said differentiation/demodulation circuit includes circuitry for determining time intervals between peaks in said amplified analog signals.

30. The device of claim 29 wherein said signal processing circuitry further comprises an analog to digital converter coupled to differentiation/demodulation circuit for digitizing said differentiated analog signals.

31. The device of claim 30 wherein said analog to digital converter is coupled to said processor, and wherein said processor decodes digitized signals in accordance with a barcode protocol.

* * * * *